US011653356B2

(12) United States Patent
Ohta et al.

(10) Patent No.: US 11,653,356 B2
(45) Date of Patent: May 16, 2023

(54) WIRELESS COMMUNICATIONS SYSTEM, WIRELESS STATION, BASE STATION, AND COMMUNICATIONS METHOD

(71) Applicant: FUJITSU LIMITED, Kawasaki (JP)

(72) Inventors: Yoshiaki Ohta, Yokohama (JP); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 917 days.

(21) Appl. No.: 14/558,054

(22) Filed: Dec. 2, 2014

(65) Prior Publication Data
US 2015/0085811 A1    Mar. 26, 2015

Related U.S. Application Data

(63) Continuation of application No. PCT/JP2012/065777, filed on Jun. 20, 2012.

(51) Int. Cl.
H04W 12/037     (2021.01)
H04W 72/21      (2023.01)
(Continued)

(52) U.S. Cl.
CPC ............. H04W 72/21 (2023.01); H04L 1/12 (2013.01); H04W 12/037 (2021.01);
(Continued)

(58) Field of Classification Search
CPC ............. H04W 72/00; H04W 72/04; H04W 72/0413; H04W 72/1268; H04W 12/0017;
(Continued)

(56) References Cited

U.S. PATENT DOCUMENTS

2008/0081655 A1*  4/2008  Shin ................. H04W 52/08
                                              455/522
2008/0242308 A1* 10/2008  Gunnarsson ...... H04W 72/0486
                                              455/450
(Continued)

FOREIGN PATENT DOCUMENTS

JP    2009-514279    4/2009
JP    2010-041066    2/2010
(Continued)

OTHER PUBLICATIONS

3GPP TS 36.321 V10.4.0 (Dec. 2011) 3rd Generation Partnership Project; Technical Specification Group Radio Access Network; Evolved Universal Terrestrial Radio Access (E-UTRA); Medium Access Control (MAC) protocol specification (Release 10).
(Continued)

Primary Examiner — Salvador E Rivas
(74) Attorney, Agent, or Firm — Myers Wolin, LLC

(57) ABSTRACT

A wireless communications system includes a base station; and a wireless station. The base station reserves, in advance, a radio parameter that includes at least any one among a frequency resource and communication method used in transmission of uplink data by a first control signal transmitted to the wireless station and upon receiving a second control signal from the wireless station, provides authorization for the transmission of uplink data, by transmitting a third control signal to the wireless station. The wireless station, upon transmitting the second control signal to the base station, uses the radio parameter configured by the first control signal received from the base station to perform transmission of the uplink data to the base station.

11 Claims, 13 Drawing Sheets

(51) Int. Cl.
  *H04L 1/12* (2006.01)
  *H04W 72/1268* (2023.01)
  *H04W 72/20* (2023.01)
  *H04W 72/231* (2023.01)

(52) U.S. Cl.
  CPC ....... *H04W 72/1268* (2013.01); *H04W 72/20* (2023.01); *H04W 72/231* (2023.01)

(58) Field of Classification Search
  CPC . H04W 12/037; H04W 72/20; H04W 72/231; H04W 72/232; H04L 1/12; H04L 29/06183; H04L 29/0619
  See application file for complete search history.

(56) References Cited

U.S. PATENT DOCUMENTS

| | | | | |
|---|---|---|---|---|
| 2008/0311923 | A1* | 12/2008 | Petrovic | H04W 76/12 455/450 |
| 2009/0088175 | A1 | 4/2009 | Pelletier et al. | |
| 2010/0027414 | A1* | 2/2010 | Hamachi | H04W 48/16 370/216 |
| 2010/0039988 | A1* | 2/2010 | Narasimha | H04W 12/08 370/328 |
| 2010/0041370 | A1* | 2/2010 | Narasimha | H04W 74/008 455/410 |
| 2010/0111032 | A1* | 5/2010 | Wu | H04W 74/0833 370/331 |
| 2010/0150082 | A1* | 6/2010 | Shin | H04W 72/1284 370/329 |
| 2011/0092240 | A1 | 4/2011 | Aiba et al. | |
| 2011/0107169 | A1* | 5/2011 | Lohr | H04W 72/042 714/748 |
| 2011/0170499 | A1* | 7/2011 | Nayeb Nazar | H04L 1/1812 370/329 |
| 2011/0292790 | A1* | 12/2011 | Iwamura | H04W 36/0033 370/225 |
| 2012/0014349 | A1* | 1/2012 | Chung | H04W 72/0453 370/329 |
| 2012/0044897 | A1* | 2/2012 | Wager | H04L 1/0039 370/329 |
| 2012/0046032 | A1* | 2/2012 | Baldemair | H04W 72/0413 455/434 |
| 2012/0250601 | A1* | 10/2012 | Choi | H04W 88/04 370/329 |
| 2013/0010722 | A1* | 1/2013 | Suzuki | H04W 72/04 370/329 |
| 2013/0010746 | A1* | 1/2013 | McCoy | H04L 5/0007 370/330 |
| 2013/0182563 | A1* | 7/2013 | Johansson | H04W 48/17 370/228 |
| 2013/0265963 | A1 | 10/2013 | Suzuki et al. | |
| 2014/0169343 | A1* | 6/2014 | Skov | H04L 5/003 370/336 |
| 2014/0313978 | A1* | 10/2014 | Tajima | H04W 52/0216 370/328 |
| 2015/0223228 | A1* | 8/2015 | Rune | H04W 72/1278 370/311 |
| 2017/0099658 | A1* | 4/2017 | Shattil | H04L 63/061 |
| 2017/0135000 | A1* | 5/2017 | Cai | H04W 72/14 |
| 2017/0164298 | A1* | 6/2017 | Ryoo | H04W 52/146 |
| 2019/0182849 | A1* | 6/2019 | Lee | H04W 24/08 |

FOREIGN PATENT DOCUMENTS

| | | |
|---|---|---|
| JP | 2010-541411 A | 12/2010 |
| JP | 2011-166412 | 8/2011 |
| WO | 2009-128285 | 10/2009 |
| WO | 2012/063754 A1 | 5/2012 |

OTHER PUBLICATIONS

International Search report issued for corresponding international patent application No. PCT/JP/2012/065777, dated Sep. 11, 2012.
Office Action issued for corresponding Japanese Patent Application No. 2014-521157 dated Oct. 20, 2015 with a partial English translation.
International Preliminary Report on Patentability for corresponding International Patent Application No. PCT/JP2012/065777 dated Dec. 31, 2014 with English translation.
International Preliminary Report on Patentability with Written Opinion of the International Searching Authority for corresponding International Patent Application No. PCT/JP2012/065777 dated Dec. 31, 2014.

* cited by examiner

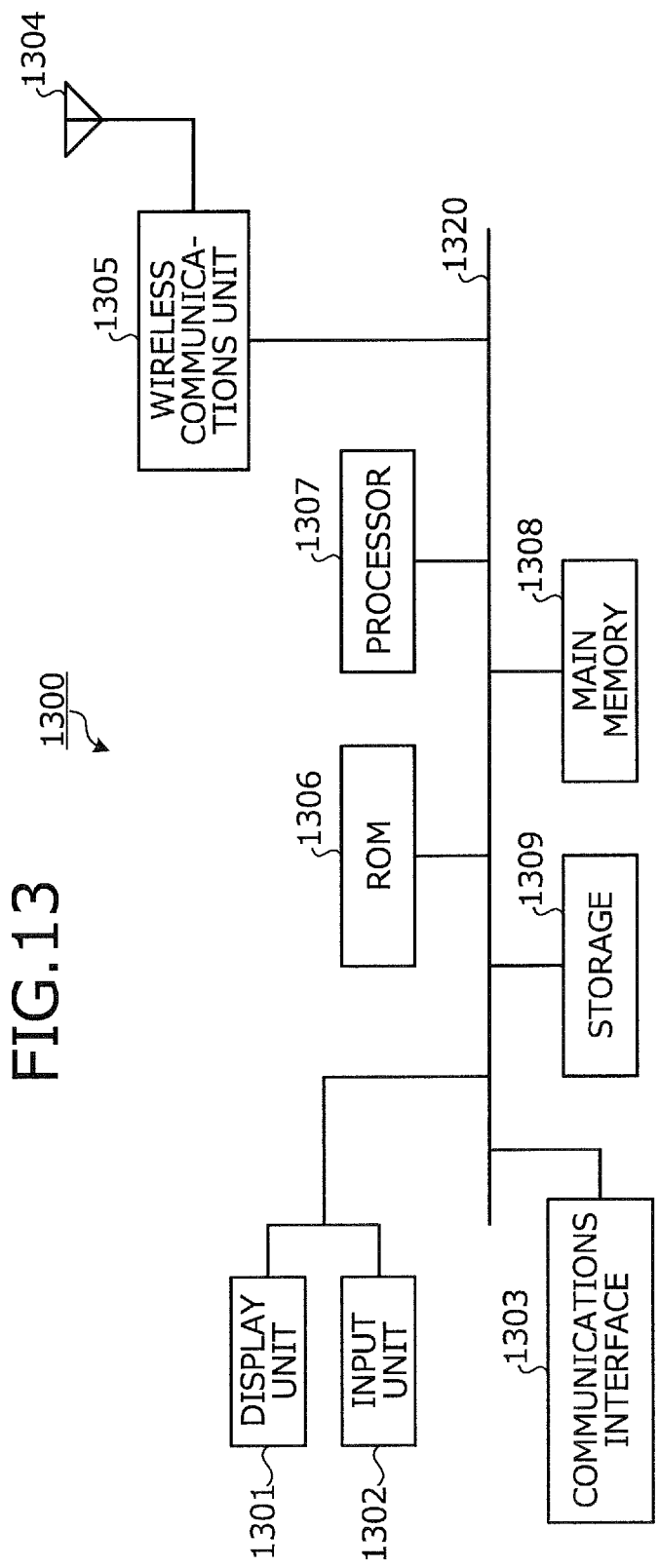

WIRELESS COMMUNICATIONS SYSTEM, WIRELESS STATION, BASE STATION, AND COMMUNICATIONS METHOD

CROSS REFERENCE TO RELATED APPLICATIONS

This application is a continuation application of International Application PCT/JP2012/065777, filed on Jun. 20, 2012 and designating the U.S., the entire contents of which are incorporated herein by reference.

FIELD

The embodiments discussed herein are related to a wireless communications system, a wireless station, a base station, and a communications method.

BACKGROUND

Conventionally, for example, under the 3rd Generation Partnership Project (3GPP), a scheduling request (SR) scheme is specified as one example of a scheme for performing uplink communication in a wireless communications system (for example, refer to Published Japanese-Translation of PCT Application, Publication No. 2009/128285 and 3GPP TS36.321, "Medium Access Control (MAC) protocol specification", V10.4.0, Release 10, December 2011).

Under the scheduling request scheme, when a wireless station detects the arrival of uplink data and transmits regular buffer status reporting (regular BSR), the wireless station transmits a scheduling request to a base station. Regular BSR is transmitted when data arrives that has a high quality of service (QoS) or is new data.

Further, if SR resources are assigned by a physical uplink control channel (PUCCH), which is an uplink control channel, the wireless station transmits a scheduling request to the base station, by the PUCCH. If no SR resources have been assigned by the PUCCH, the wireless station requests the base station to schedule uplink data by random access.

Upon receiving the scheduling request from the wireless station, the base station, provides uplink transmission authorization to the wireless station, via a physical downlink control channel (PDCCH).

For example, to assess the volume of data arriving at the wireless station, the base station assigns uplink resources to the wireless station. Uplink resources are assigned to an extent that enables transmission of BSR. In response, the wireless station reports the BSR using the uplink resources assigned by the base station. Thus, the base station assesses the volume of data that has arrived at the wireless station and thereafter, provides uplink transmission authorization via the PDCCH.

Upon receiving the uplink transmission authorization, the wireless station uses a radio parameter specified by the PDCCH to transmit uplink data by a physical uplink shared channel (PUSCH). The radio parameter includes, for example, parameters for frequency resources and the modulation scheme, the coding scheme, etc.

Nonetheless, with the technologies above, since control signal overhead arises for each transmission of uplink data, if uplink data is frequently transmitted, communication may not be performed efficiently.

SUMMARY

According to an aspect of an embodiment, a wireless communications system includes a base station; and a wireless station. The base station reserves, in advance, a radio parameter that includes at least any one among a frequency resource and communication method used in transmission of uplink data by a first control signal transmitted to the wireless station and upon receiving a second control signal from the wireless station, provides authorization for the transmission of uplink data, by transmitting a third control signal to the wireless station. The wireless station, upon transmitting the second control signal to the base station, uses the radio parameter configured by the first control signal received from the base station to perform transmission of the uplink data to the base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a diagram depicting one example of a hardware configuration of the base station.

DESCRIPTION OF EMBODIMENTS

Embodiments of a wireless communications system, a wireless station, a base station, and a communications method will be described in detail with reference to the accompanying drawings.

Figure 1:
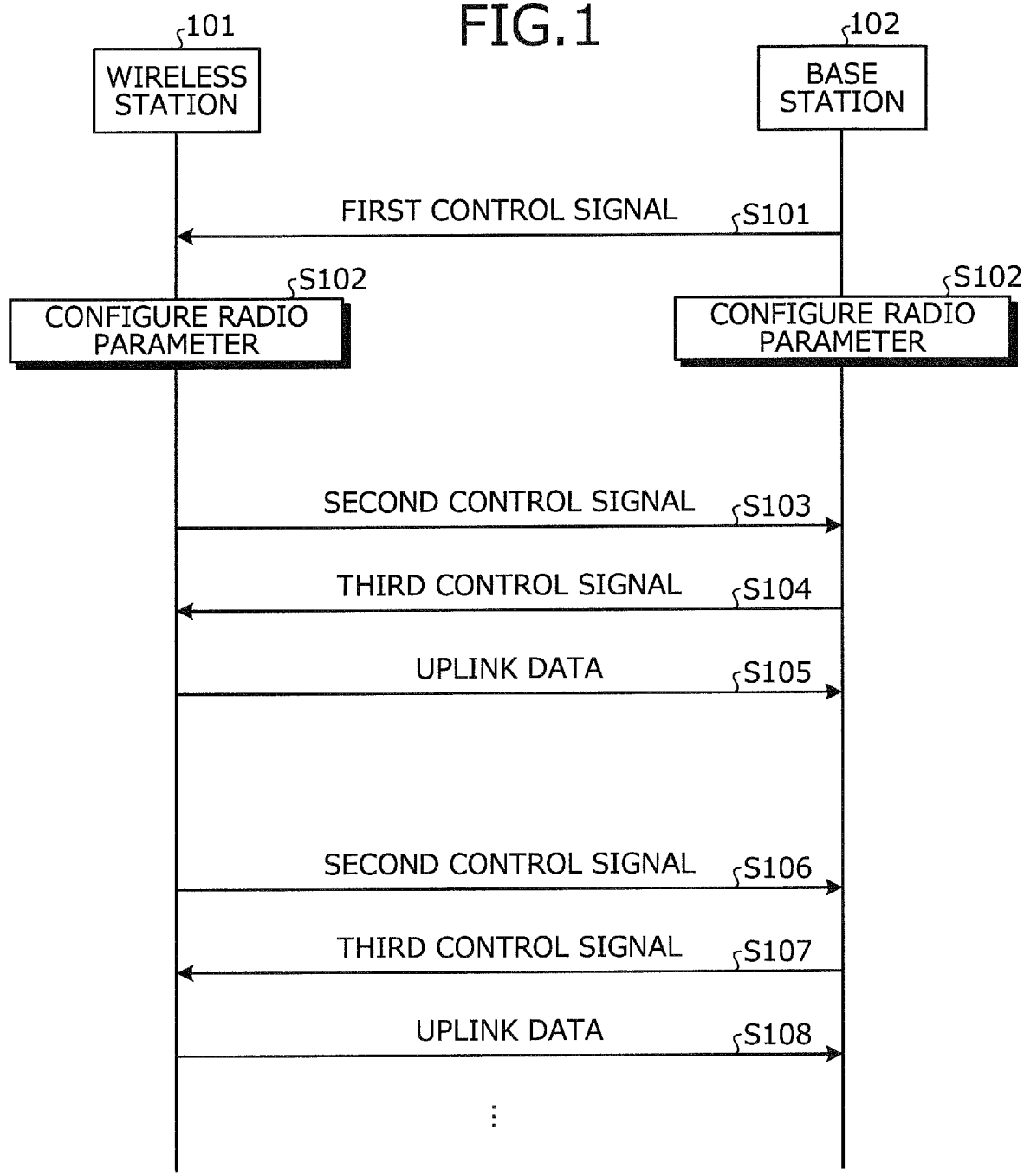
FIG. 1 is a sequence diagram depicting one example of operation of a wireless communications system according to a first embodiment.

FIG. 1 is a sequence diagram depicting one example of operation of a wireless communications system according to a first embodiment. The wireless communications system according to the first embodiment includes a wireless station 101 and a base station 102 depicted in FIG. 1. The base station 102 is an evolved Node B (eNB), for example. The wireless station 101 is a user terminal (User Equipment (UE)), for example. The wireless station 101 and the base station 102 communicate wirelessly with each other.

The base station 102 transmits a first control signal to the wireless station 101 (step S101). For example, the base station 102 determines the radio parameter to be used for the transmission of uplink data from the wireless station 101 to the base station 102 and transmits a first control signal that includes the determined radio parameter to the wireless station 101. The radio parameter includes a parameter for at least any one among frequency resources (radio resources) and communication schemes such as the modulation scheme, the coding scheme, etc. The wireless station 101 and the base station 102 respectively configure therein the radio parameter indicated by the first control signal transmitted at step S101 (step S102).

The wireless station 101 transmits a second control signal to the base station 102 if uplink data arises that is to be sent to the base station 102 (step S103). The second control signal is a signal that requests the base station 102 to provide authorization to transmit uplink data by the radio parameter configured at step S102.

The base station 102 transmits a third control signal to the wireless station 101 (step S104). The third control signal is a signal that indicates whether transmission of uplink data by the radio parameter configured at step S102 is authorized. For example, if the base station 102 authorizes the transmission of the uplink data by the wireless station 101, the base station 102 transmits to the wireless station 101, a third control signal indicating that transmission of the uplink data is authorized.

In response, the wireless station 101 transmits the uplink data to the base station 102, by the radio parameter configured at step S102 (step S105). If the base station 102 does not authorize the transmission of the uplink data by the wireless station 101, at step S104, the base station 102 transmits to the wireless station 101, a third control signal indicating that the transmission of the uplink data is not authorized. In this case, the wireless station 101 does not transmit the uplink data at step S105.

If uplink data that has not yet been transmitted remains or if uplink data newly arises, the wireless station 101 transmits a second control signal to the base station 102 (step S106). The base station 102 transmits a third control signal to the wireless station 101 (step S107). For example, if the base station 102 authorizes the transmission of uplink data by the wireless station 101, the base station 102 transmits to the wireless station 101, a third control signal indicating that the transmission of the uplink data is authorized.

In response, the wireless station 101 uses the radio parameter configured at step S102 and transmits the uplink data to the base station 102 (step S108). If the base station 102 does not authorize the transmission of the uplink data by the wireless station 101, at step S107, the base station 102 transmits to the wireless station 101, a third control signal indicating that the transmission of the uplink data is not permitted. In this case, the wireless station 101 does not transmit the uplink data at step S108.

Thereafter, the wireless station 101 and the base station 102 performs the same operations as those at steps S106 to S108, for each transmission of uplink data.

In this manner, by transmitting uplink data from the wireless station 101 to the base station 102 by the radio parameter preconfigured when communication starts, control signal overhead accompanying the transmission of uplink data can be reduced. For example, at steps S105 and S108, since notification of the radio parameter does not have to be newly given to the wireless station 101 from the base station 102 when uplink data is transmitted, the control signal overhead accompanying the transmission of uplink data can be reduced. Thus, efficient communication can be facilitated. For example, reductions in the power consumption of the wireless station 101 and the base station 102 can be facilitated.

The wireless station 101 is a wireless communications apparatus that periodically transmits a small volume of uplink data, for example. In this case, if notification of the radio parameter is given to the wireless station 101 from the base station 102 each time uplink data is transmitted, the proportion of control signal overhead for the uplink data to be transmitted increases and communication cannot be performed efficiently. In contrast, the wireless station 101 and the base station 102 perform multiple uplink data transmissions by a preconfigured radio parameter, whereby the proportion of the control signal overhead for the uplink data to be transmitted becomes lower, enabling communication to be performed efficiently.

Further, for example, the wireless station 101 is a stationary wireless communications apparatus that is fixed at a specific location and performs wireless communication. In this case, changes in the wireless environment between the wireless station 101 and the base station 102 are small and therefore, even if the radio parameter is not updated each time uplink data is transmitted, wireless communication can be performed stably between the wireless station 101 and the base station 102.

Further, the first control signal may include multiple candidates of a radio parameter to be used for the transmission of uplink data. In this case, to transmit uplink data, the wireless station 101 uses a radio parameter arbitrarily selected from among the candidates. In response, the base station 102 performs reception operations to enable reception irrespective of the radio parameter by which the uplink data is transmitted, among the candidates. Thus, even if notification and updating of the radio parameter is not performed each time uplink data is transmitted, the wireless station 101 can select a radio parameter and transmit uplink data as the situation demands. Therefore, the degrees of freedom in the configuration of the radio parameter can be improved.

Here, although a wireless communications system that includes the wireless station 101 and the base station 102 has been described as one example, the architecture of the wireless communications system is not limited hereto. For example, in the wireless communications system depicted in FIG. 1, the architecture may be such that a relay station is deployed in place of the wireless station 101. Alternatively, in wireless communications system depicted in FIG. 1, the architecture may be such that a relay station is deployed in place of the base station 102.

Thus, in the wireless communications system according to the first embodiment, the base station 102 reserves, in advance, a radio parameter that is to be used for uplink transmission by the first control signal. The base station 102, upon receiving a second control signal from the wireless station 101, transmits to a third control signal to the wireless station 101 and thereby provides transmission authorization for the uplink data.

Meanwhile, upon transmitting the second control signal to the base station 102, the wireless station 101 receives the third control signal from the base station 102, uses the radio parameter configured by the first control signal, and performs transmission of the uplink data. Thus, the control signal overhead accompanying the transmission of uplink data can be reduced, enabling the efficiency of the communication to be facilitated. For example, reductions in the power consumption of the wireless station 101 and the base station 102 can be facilitated.

One example of a system to which the wireless communications system depicted in FIG. 1 is applied will be described. The wireless communications system depicted in FIG. 1, for example, is applicable to Long Term Evolution (LTE). Under LTE, a scheme based on orthogonal frequency division multiplexing (OFDM) is specified as a wireless access technology.

Under LTE, high-speed, wireless packet communication is possible, where the downlink peak transmission rate is 100 [Mb/s] or greater, and the uplink peak transmission rate is 50 [Mb/s] or greater. Aiming to realize even faster communication, the 3rd Generation Partnership Project (3GPP), an international standardizing body, has begun investigating LTE-Advanced (LTE-A) for wireless mobile communications systems, based on LTE.

The wireless communications system depicted in FIG. 1 is further applicable to LTE-A. Under LTE-A, a peak downlink transmission rate of 1 [Gb/s] is targeted, a peak uplink transmission rate of 500 [Mb/s] is targeted, and technological investigation of wireless access schemes and network architecture is being conducted.

Under LTE-A (or LTE Rel-11), wireless stations which generate traffic that differs from the traffic observed in conventional systems are connected. For example, communication is assumed where various types of stationary, non-mobile devices such as electricity meters including sensors and gas meters are connected to a cellular network and perform communication. Such communication is called machine-type communication.

Communication with a fixed timing can be given as one characteristic of traffic occurring with machine-type communication. For example, an electricity meter and a gas meter periodically transmit to a server, reports concerning the amount of electricity and gas used. Relatively low traffic volume is another characteristic of the traffic occurring with machine-type communication.

Yet another characteristic of the traffic occurring with machine-type communication is that the non-mobile devices do not move, eliminating the importance of system design that considers mobility, which is the point of mobile communication.

Figure 2:
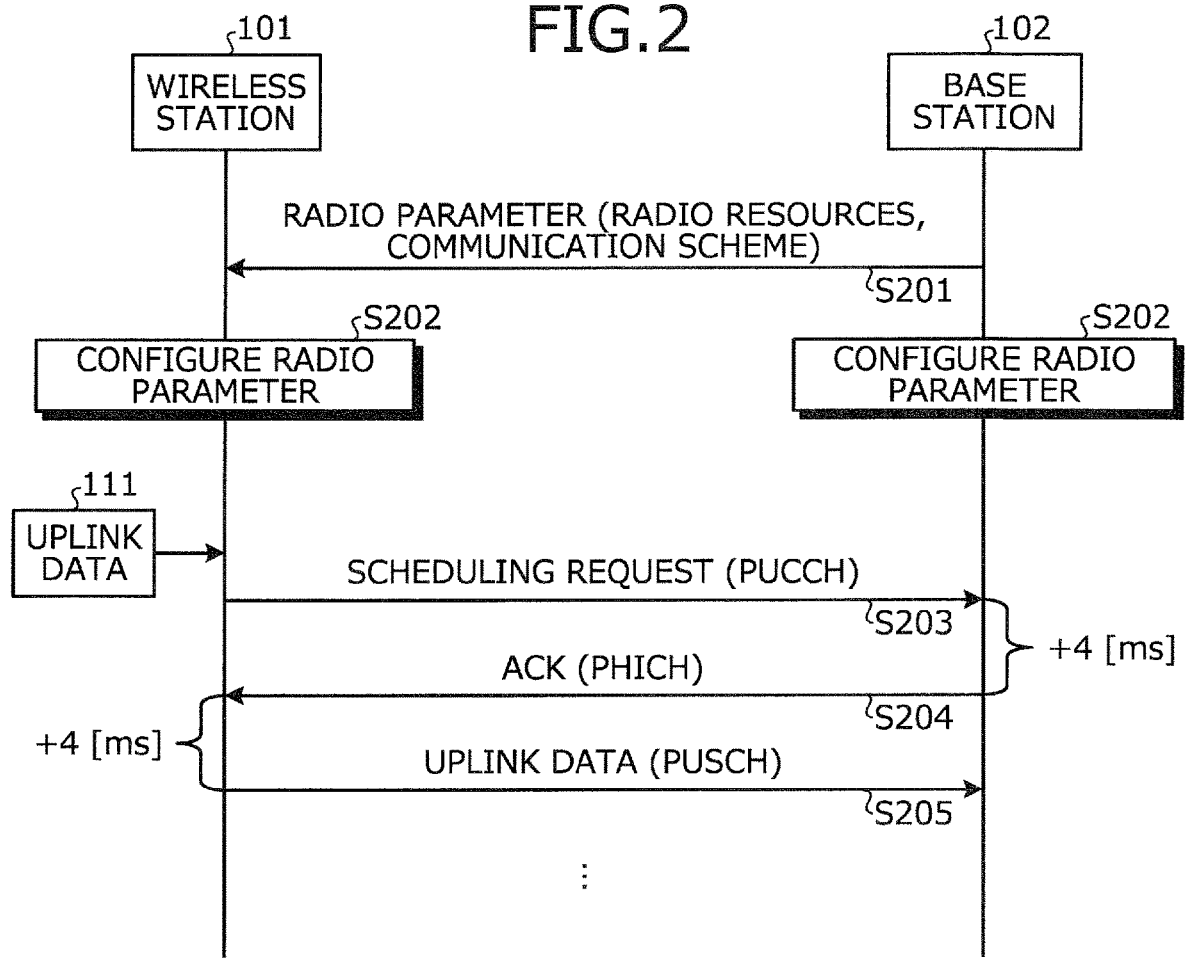
FIG. 2 is a sequence diagram depicting one example of operation of the wireless communications system according to a second embodiment.

FIG. 2 is a sequence diagram depicting one example of operation of the wireless communications system according to a second embodiment. The wireless station 101 and the base station 102 according to the second embodiment, for example, execute the following steps. The base station 102 transmits to the wireless station 101, a radio parameter that is to be used in the transmission of uplink data from the wireless station 101 to the base station 102 (step S201). The transmission of radio parameter, for example, can be performed with a downlink control signal of the radio resource control (RRC) connection operations (e.g., RRC connection setup) between the wireless station 101 and the base station 102.

The radio parameter for which notification is given at step S201 includes, for example, radio resources (frequency resources), and communication scheme parameters such as for the modulation scheme, the coding scheme, etc. The wireless station 101 and the base station 102 respectively configure therein the radio parameter transmitted at step S201 (step S202).

When uplink data 111 arises (arrives) that is to be transmitted to the base station 102, the wireless station 101 transmits a scheduling request to the base station 102 (step S203). The transmission of the scheduling request at step S203 is performed by the PUCCH, for example.

If the base station 102 authorizes the transmission of the uplink data 111 by the wireless station 101 using the radio parameter configured at step S202, the base station 102 transmits an acknowledgement signal (ACK) to the wireless station 101 (step S204). The transmission of the ACK at step S204 is by a physical HARQ indicator channel (PHICH), for example. Further, the transmission of the ACK at step S204 is performed when a given period has elapsed after the receipt of the scheduling request at step S203.

The wireless station 101 transmits the uplink data 111 to the base station 102 by using the radio parameter configured at step S202 (step S205). The transmission of the uplink data 111 at step S205 is performed by a PUSCH, for example. Further, the transmission of the uplink data 111 at step S205 is performed when a given period has elapsed since the receipt of the ACK at step S204, for example.

If the base station 102 does not authorize the transmission of the uplink data 111 by the wireless station 101, at step S204, the base station 102 transmits a non-acknowledgement (NACK) signal to the wireless station 101 by a PHICH, for example. In this case, the transmission of the uplink data 111 at step S205 is not performed. In this case, for example, the wireless station 101 retransmits the scheduling request to the base station 102.

The timing at which the wireless station 101 retransmits the scheduling request can be configured to be the earliest PUCCH timing, for example. Further, the wireless station 101 may retransmit the scheduling request after standing by for a given period (backoff). As a result, when a NACK is transmitted because the load of the base station 102 is high, the scheduling request can be retransmitted after the load of the base station 102 has decreased. Concerning the period that the wireless station 101 stands by before retransmitting the scheduling request, for example, notification of a given upper limit of the period (e.g., 100 [ms]) may be given to the wireless station 101 from the base station 102, whereby the wireless station 101 stands by for a random period of time within the upper limit.

Hereinafter, the wireless station 101 and the base station 102 perform the same operations as those at steps S203 to S205 until the uplink data 111 that is to be transmitted no longer remains.

The interval from when the base station 102 receives the scheduling request at step S203 until the ACK is transmitted at step S204 can be configured as 4 [ms], for example, because the base station 102 calculates frequency resources for transmitting the PHICH, based on a resource of the received PUCCH. In other words, if the interval for transmitting the PHICH for the scheduling request is too long, other wireless stations cannot transmit a PUCCH during that time and consequently, the efficiency of resource utilization of the PUCCH decreases. Further, if the transmission interval for the PHICH is too short, the base station 102 cannot perform transmission processing for the PHICH.

In addition, the interval from when the base station 102 receives the scheduling request at step S203 until the transmission of the ACK at step S204 may be greater than 4 [ms]. As a result, for example, if the downlink traffic load of the base station 102 is high, the transmission of the PHICH can be extended until the load becomes lower.

The interval from when the wireless station 101 receives the ACK at step S204 until the uplink data 111 is transmitted at step S205 can be configured as 4 [ms], for example, because if the interval from the receipt of the ACK until the transmission of the uplink data 111 is longer than 4 [ms], the transmission of the uplink data 111 becomes delayed. Further, if the interval from the receipt of the ACK until the transmission of the uplink data 111 is less than 4 [ms], signal processing of the wireless station 101 will not be in time.

Figure 3:
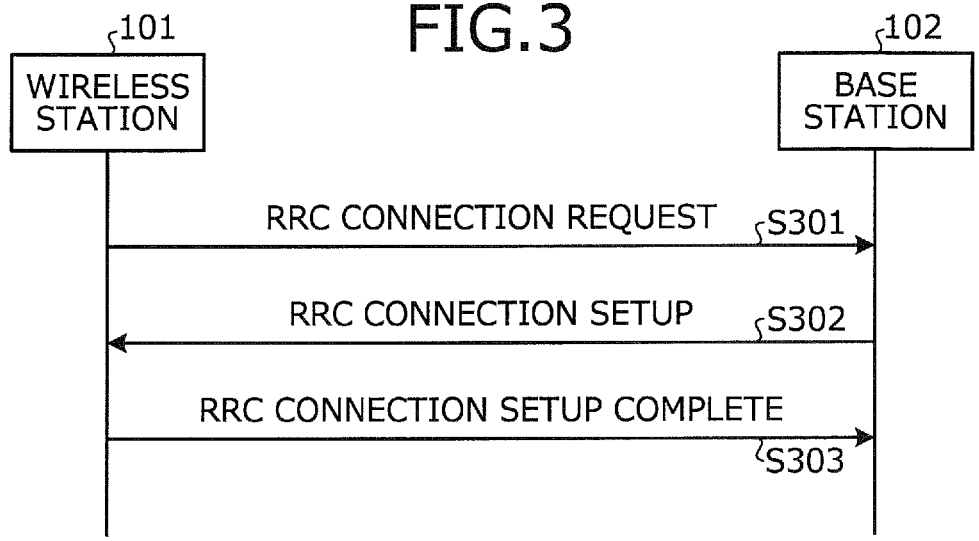
FIG. 3 is a sequence diagram depicting one example of operation of RRC connection of the wireless communications system.

FIG. 3 is a sequence diagram depicting one example of operation of RRC connection of the wireless communications system. The wireless station 101 and the base station 102 of the wireless communications system execute, for example, each of the steps below when SR resources of the PUCCH have been assigned for the wireless station 101, by the base station 102.

The wireless station 101 transmits to the base station 102, an RRC connection request (call connection request) that includes an identifier of the wireless station 101 and reason for connection (step S301). The wireless station 101 further notifies the base station 102 that the wireless station 101 is a non-mobile device. The base station 102 is notified by the RRC connection request at step S301.

Meanwhile, the base station 102 recognizes which wireless station is connected, based on the identifier of the wireless station 101 obtained from the RRC connection request. To attempt RRC setup, the base station 102 transmits to the wireless station 101, RRC connection setup (call connection setup) that includes the radio parameter (step S302).

Meanwhile, upon completing configuration of the radio parameter included in the RRC connection setup, the wireless station 101 transmits RRC connection setup complete (call connection setup complete) to the base station 102 (step S303). As a result, RRC connection between the wireless station 101 and the base station 102 is established, and the RRC state of the wireless station 101 and the base station 102 transitions from an idle mode to a connected mode.

In the notification indicating that the wireless station 101 is a non-mobile device at step S301, for example, "delay Tolerant Access-v1020" in the RRC connection request can be used. Further, in the notification indicating that the wireless station 101 is a non-mobile device, a parameter newly specified in the RRC connection request may be used. For example, "nm-Access" (non mobile access) may be specified in a "spare2" field of the RRC connection request and by the "nm-Access", whereby notification is given that the wireless station 101 is a non-mobile device.

Further, the wireless station 101 and the base station 102 of the wireless communications system execute RRC connection operations after performing random access, if no SR resources of the PUCCH have been assigned to the wireless station 101 by the base station 102.

Figure 4:
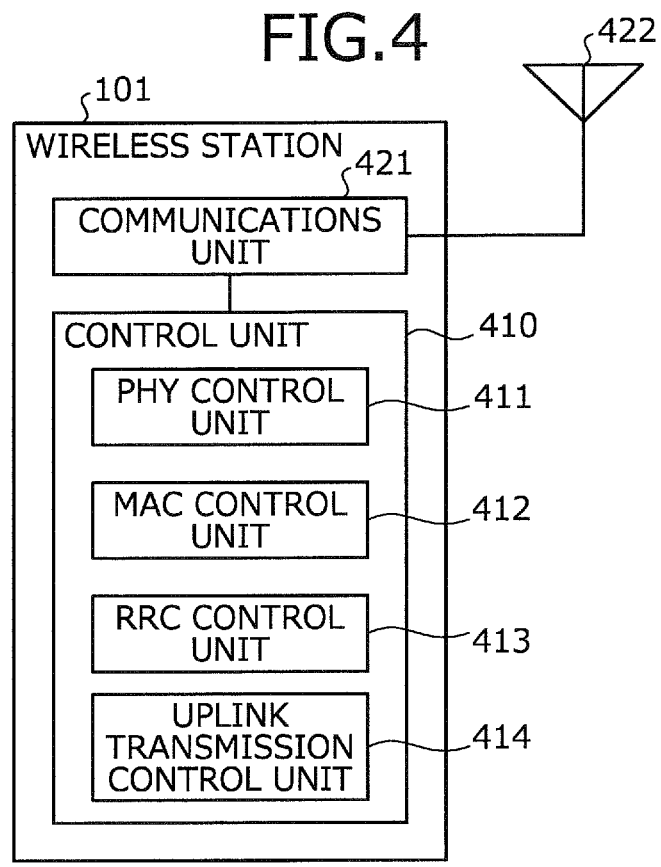
FIG. 4 is a diagram of one example of architecture of a wireless station.

FIG. 4 is a diagram of one example of architecture of the wireless station. As depicted in FIG. 4, the wireless station 101, for example, includes a control unit 410, a communications unit 421, and an antenna 422. The communications unit 421 performs transmission and reception processing of signals wirelessly transmitted via the antenna 422.

The control unit 410 performs various types of control of the wireless station 101. The control unit 410, for example, is a baseband processing unit that processes baseband signals. The control unit 410 includes a PHY control unit 411, a MAC control unit 412, an RRC control unit 413, and an uplink transmission control unit 414.

The PHY control unit 411 processes signals when wireless transmission is performed. For example, according to the modulation and coding of a wireless signal notified by the base station 102, the PHY control unit 411 generates control signal formatting transmitted by PUCCH and data signal formatting transmitted by PUSCH.

The MAC control unit 412 performs a process related to data scheduling based on wireless resources and timings specified by the base station 102. For example, the MAC control unit 412 performs uplink data buffering, BSR trigger generation, and scheduling request trigger generation.

The RRC control unit 413 controls the operation of the wireless station 101. For example, the RRC control unit 413 configures the frequency resources and communication scheme used in communication and manages the communication state of the wireless station 101. Further, the RRC control unit 413 performs a process to transition from an RRC idle mode to an RRC connected mode to enable communication, a handover process to connect to a suitable base station, etc. Further, the RRC control unit 413 performs a process of notifying the base station 102 that the wireless station 101 is a non-mobile device, via the RRC connection request.

The uplink transmission control unit 414 controls the uplink transmission of the wireless station 101. For example, when uplink transmission is requested via a BDR trigger by the MAC control unit 412, the uplink transmission control unit 414 controls the uplink transmission request to the base station 102. Further, when SR resources of the PUCCH have been assigned by the base station 102, the uplink transmission control unit 414 controls the transmission of the scheduling request. If SR resources have not been assigned, the uplink transmission control unit 414 controls random access.

Figure 5:
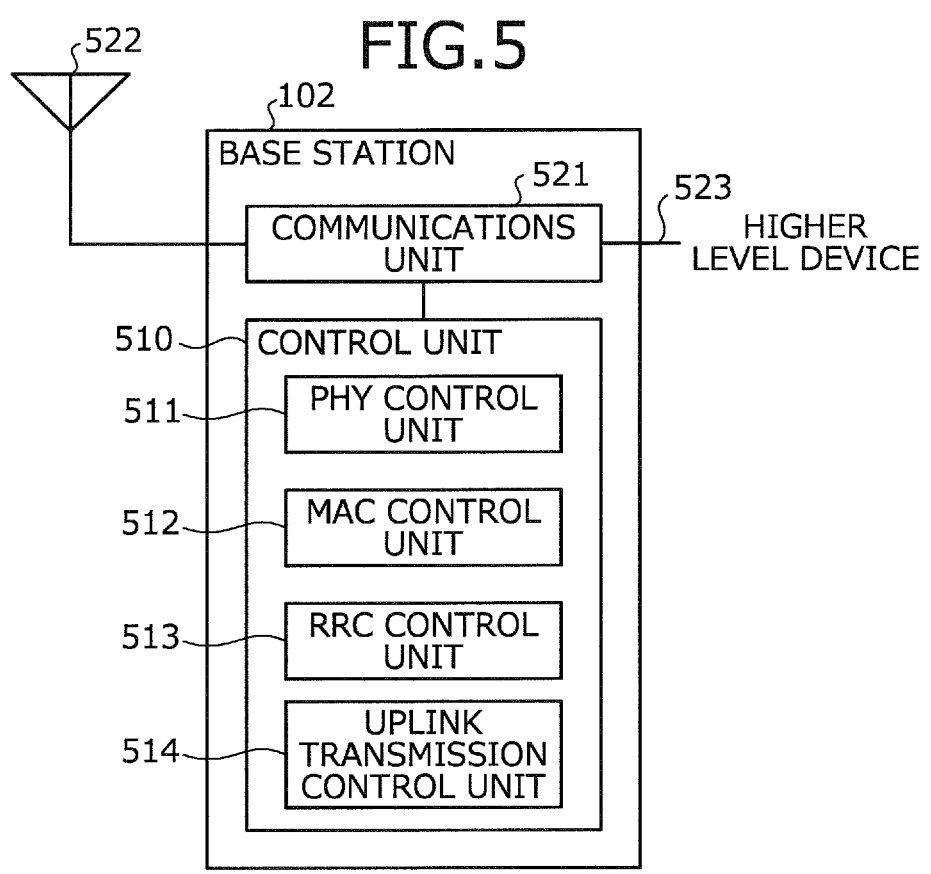
FIG. 5 is a diagram of one example of architecture of a base station.

FIG. 5 is a diagram of one example of architecture of the base station. As depicted in FIG. 5, the base station 102 includes a control unit 510, a communications unit 521, an antenna 522, and a physical-line interface 523. The communications unit 521 transmits and receives wirelessly transmitted signals, via the antenna 522. Via the physical-line interface 523, the communications unit 521 further transmits and receives signals transmitted by a physical line for communication with higher level devices.

The control unit 510 performs various types of control of the base station 10. The control unit 510, for example, is a baseband processing unit that processes baseband signals. The control unit 510 includes a PHY control unit 511, a MAC control unit 512, an RRC control unit 513, and an uplink transmission control unit 514.

The PHY control unit 511 processes signals when wireless transmission is performed. For example, the PHY control unit 511 determines the modulation and coding scheme of wireless signals. The PHY control unit 511 rebuilds control signal formatting when the PUCCH is received, and rebuilds data signal formatting with reception by the PUSCH. Further, the PHY control unit 511 generates a signal for providing uplink transmission authorization, when an uplink transmission request is received.

The MAC control unit 512 performs a process related to data scheduling. For example, the MAC control unit 512 analyzes the BSR contents and estimates the volume of data residing at the wireless station.

The RRC control unit 513 controls the operation of the base station 102. For example, the RRC control unit 513 configures the frequency resources and the communication scheme used for communication, and manages the communication state of the base station 102. For example, the RRC control unit 513 performs a process to transition from the idle mode to the connected mode to enable communication, and a handover process for connection to a suitable base station. Further, the RRC control unit 513 obtains, by RRC connection request, information indicating that the wireless station 101 is a non-mobile device.

The uplink transmission control unit 514 controls the uplink transmission of the wireless station 101. For example, the uplink transmission control unit 514 identifies the classification of the wireless station 101 and traffic type, and controls the management of the RRC state, based on the identification results. Further, the uplink control unit 514 controls uplink transmission authorization for the wireless station 101, when an uplink transmission request is detected by the PHY control unit 511.

Figure 6:
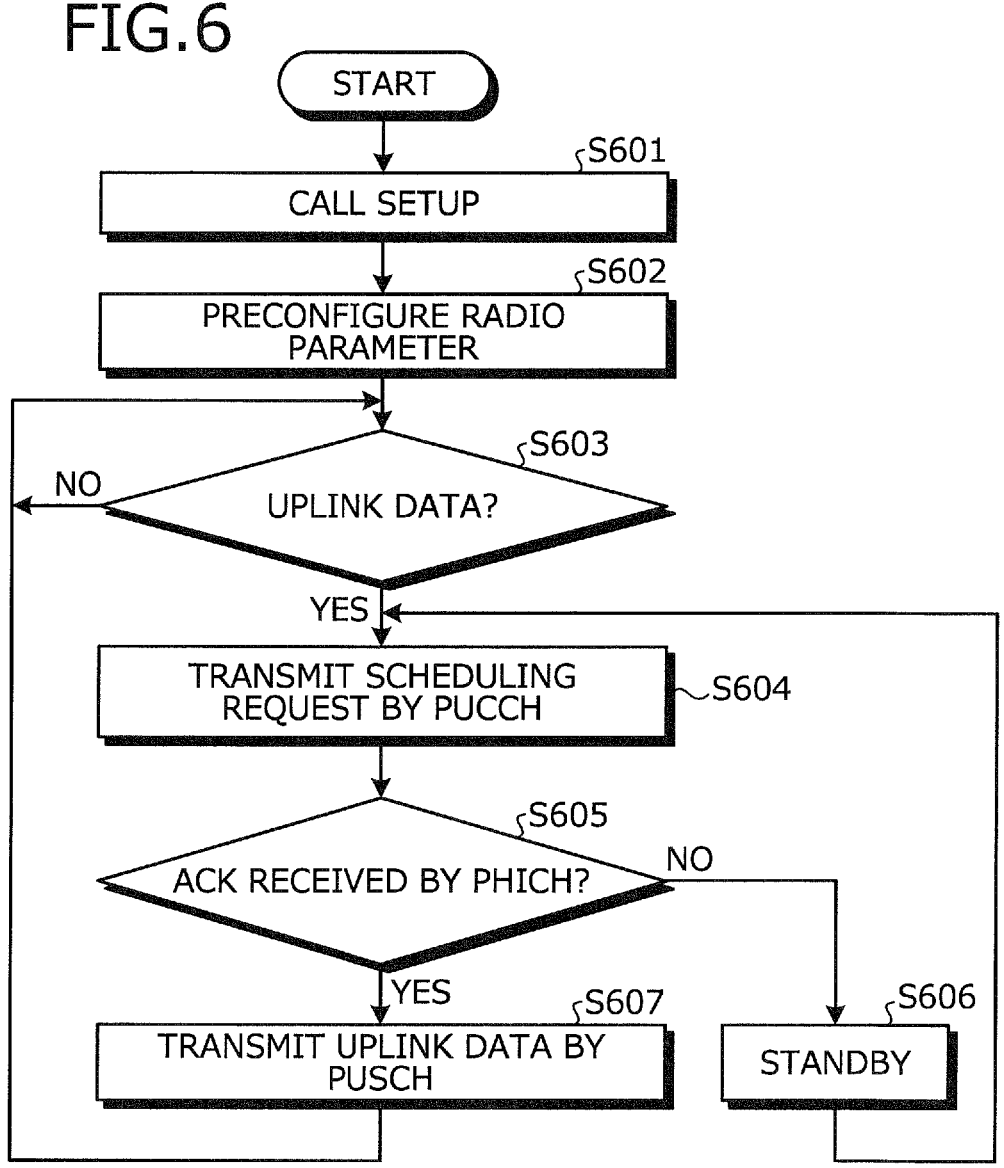
FIG. 6 is a flowchart depicting an example of operations of the wireless station according to the second embodiment.

FIG. 6 is a flowchart depicting an example of operations of the wireless station according to the second embodiment. The wireless station 101 according to the second embodiment executes the following steps, for example. The wireless station 101 performs call setup with the base station 102 (step S601). For example, the wireless station 101 performs the call setup with the base station 102 by the operations depicted in FIG. 3. Further, the wireless station 101, via the RRC connection request in the call setup at step S601, notifies the base station 102 that the wireless station 101 is a non-mobile device.

The wireless station 101 preconfigures the radio parameter obtained from the base station 102 at the call setup at step S601 (step S602). The radio parameter preconfigured at step S602 includes frequency resources, and parameters for the communication scheme such as the modulation scheme, the coding scheme, etc., for example.

The wireless station 101 determines whether uplink data that is to be transmitted to the base station 102 has arisen (step S603), and waits until such uplink data arises (step S603: NO). When uplink data arises (step S603: YES), the wireless station 101 transmits a scheduling request to the base station 102 by the PUCCH (step S604).

The wireless station 101 determines whether an ACK has been received from the base station 10, via the PHICH, in response to the scheduling request transmitted at step S604 (step S605). If no ACK has been received (step S605: NO), the wireless station 101 stands by for a given period (step S606), and returns to step S604. Thus, the wireless station 101 can transmit the scheduling request at given periods until an ACK is received from the base station 102 (backoff).

At step S605, if an ACK has been received (step S605: YES), the wireless station 101 transmits uplink data to the base station 102 by the PUSCH (step S607), and returns to step S603. In the transmission of the uplink data at step S607, the radio parameter configured at step S602 is used.

Figure 7:
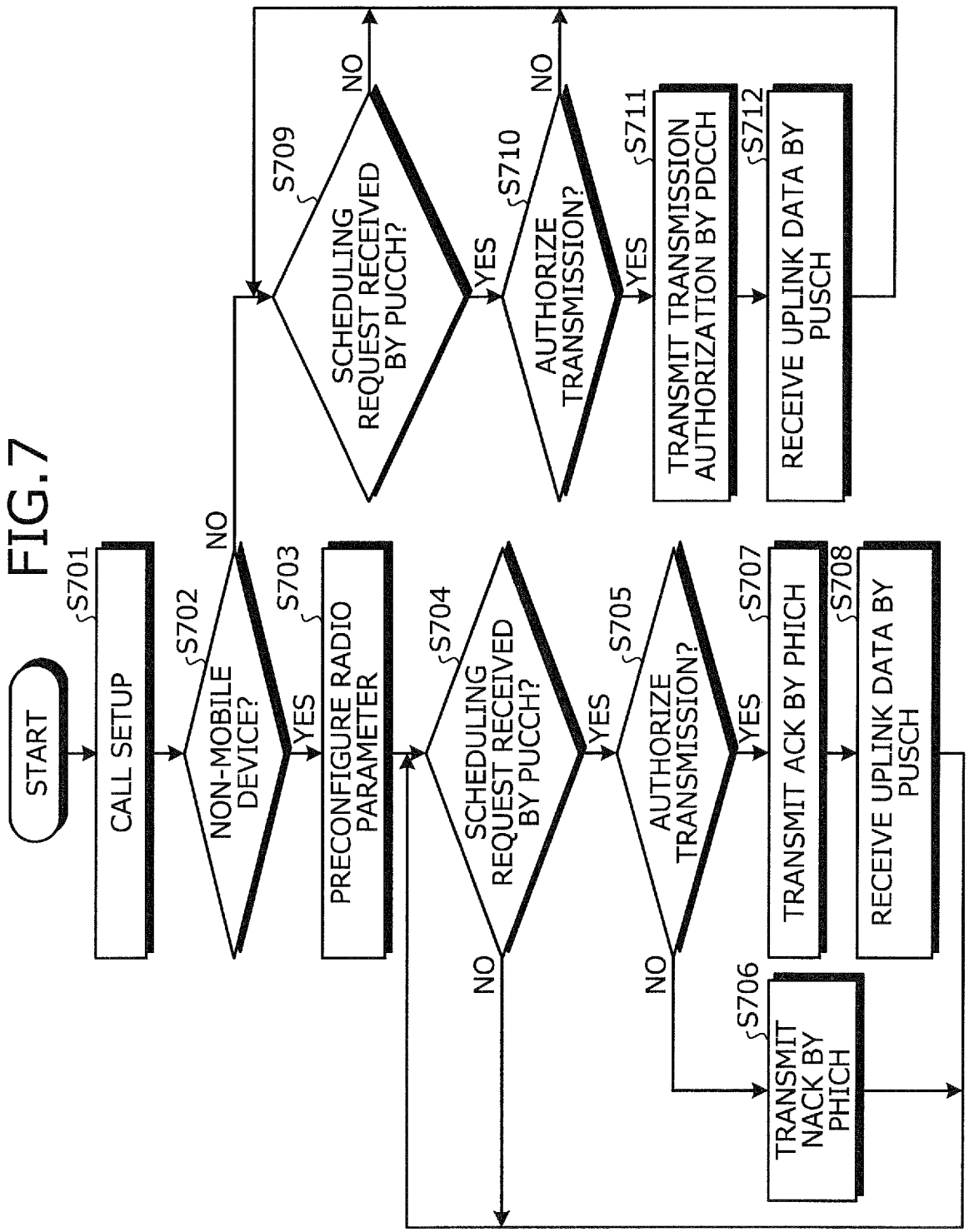
FIG. 7 is a flowchart depicting an example of operations of the base station according to the second embodiment.

FIG. 7 is a flowchart depicting an example of operations of the base station according to the second embodiment. The base station 102 according to the second embodiment, for example, executes the following step. The base station 102 performs call setup with the wireless station 101 (step S701). For example, the base station 102 performs the operations depicted in FIG. 3 to perform the call setup with the wireless station 101. Further, the base station 102, via the RRC connection request in the call setup at step S701, obtains information indicating that the wireless station 101 is a non-mobile device.

Based on the information obtained at step S701, the base station 102 determines whether the wireless station 101 is a non-mobile device (step S702). If the wireless station 101 is a non-mobile device (step S702: YES), the base station 102 preconfigures the radio parameter notified to the wireless station 101 at step S701 (step S703). The radio parameter preconfigured at step S703 includes frequency resources and parameters for the communication scheme such as the modulation scheme, the coding scheme, etc., for example.

The base station 102 determines whether a scheduling request has been received from the wireless station 101, via the PUCCH (step S704), and stands by until a scheduling request is received (step S704: NO). When a scheduling request is received (step S704: YES), the base station 102 determines whether to authorize the transmission of uplink data from the wireless station 101 (step S705).

At step S705, if the transmission is not to be authorized (step S705: NO), the base station 102 transmits a NACK to the wireless station 101, via the PHICH (step S706), and returns to step S704. If the transmission is to be authorized (step S705: YES), the base station 102 transmits an ACK to the wireless station 101, via the PHICH (step S707). The base station 102 receives uplink data from the wireless station 101, via the PUSCH (step S708), and returns to step S704.

At step S702, if the wireless station 101 is not a non-mobile device (step S702: NO), the base station 102 determines whether a scheduling request has been received, via the PUCCH (step S709), and stands by until a scheduling request is received (step S709: NO). When a scheduling request is received (step S709: YES), the base station 102 determines whether to authorize the transmission of uplink data from the wireless station 101 (step S710).

At step S710, if the transmission is not to be authorized (step S710: NO), the base station 102 returns step S709. If the transmission is to be authorized (step S710: YES), the base station 102 transmits transmission authorization to the wireless station 101, via the PDCCH (step S711). The base station 102 receives uplink data from the wireless station 101, via the PUSCH (step S712), and returns to step S709.

Thus, in the wireless communications system according to the second embodiment, the base station 102 reserves, in advance, a radio parameter that is to be used for uplink transmission by RRC connection setup (first control signal). The base station 102, upon receiving a scheduling request (second control signal) from the wireless station 101, transmits an ACK (third control signal) to the wireless station 101 and thereby, provides transmission authorization for the uplink data.

Meanwhile, the wireless station 101, after transmitting the scheduling request to the base station 102, receives an ACK from the base station 102 and uses the radio parameter configured by the RRC connection setup to perform uplink data transmission. Thus, the control signal overhead associated with the transmission of uplink data can be reduced, facilitating communication efficiency. For example, reductions in the power consumption of the wireless station 101 and the base station 102 can be facilitated.

For example, assuming that notification of the frequency and communication scheme is given, via the PDCCH, for each transmission of the uplink data, and if the PDCCH aggregation level is 2, the PDCCH size is 144 bits. In contrast, according to the wireless communications system of the second embodiment, since giving notification of whether the transmission of the uplink data is authorized suffices, the PHICH can be used for the control signal of each transmission of uplink data, for example. The size of the control signal of the PHICH is, for example, 12 bits and therefore, the control signal overhead can be suppressed as compared to the case of transmitting the PDCCH each time uplink data is transmitted.

Further, for example, under a scheme in which transmission authorization for uplink data is transmitted by the PUCCH, when the arrival of uplink data frequently occurs and the regular BSR is frequently triggered, signaling overhead of the uplink transmission authorization signal for transmitting BSR increases, in particular. In contrast, according to the wireless communications system according to the second embodiment, the control signal overhead accompanying the transmission of uplink data is reduced by transmitting the uplink data by a frequency and communication scheme preconfigured, thereby enabling efficient communication.

Concerning the wireless communications system according to a third embodiment, portions differing from those of the wireless communications system according to the second embodiment will be described.

The wireless station 101 according to the third embodiment notifies the base station 102, by UE capability, that the wireless station 101 is a non-mobile device. UE capability, for example, is specified under the LTE Rel-10, and is information that notifies the base station 102 of the category to which the wireless station 101 belongs. As a result, the wireless station 101 can notify the base station 102 of the communication capability of the wireless station 101.

For example, a category called "Category 9" for non-mobile devices can be newly created and the value of the data size, etc. can be configured to be less than that for "Category 1" (e.g., 1/8). The wireless station 101 transmits UE capability that indicates "Category 9" to the base station 102. Thus, the base station 102 can determine that the wireless station 101 is a non-mobile device having a small communication data size.

For example, in the call setup, the base station 102 transmits to the wireless station 101, a UE capability enquiry that requests notification of the UE capability. In response, the wireless station 101 transmits to the base station 102, UE capability enquiry information that includes "Category 9". Thus, the base station 102 obtains UE capability indicating "Category 9" and can determine that the wireless station 101 is a non-mobile device.

Thus, according to the wireless communications system of the third embodiment, the wireless station 101 can notify the base station 102, by UE capability, that the wireless station 101 is a non-mobile device.

Concerning the wireless communications system according to a fourth embodiment, portions differing from the wireless communications system according to the second embodiment or the third embodiment will be described.

Even if the wireless station 101 is a non-mobile device, the non-mobile device may not always be static such as in the case of a health meter or security sensor. Thus, the base station 102 transmits activation signals (Activation) and deactivation signals (Deactivation) to the wireless station 101. Activation is a signal instructing transition to a mode of performing state transition by a preconfigured timing. Deactivation is a third control signal instructing transition to a mode of configuring the radio parameter for each data communication and performing state transition.

For example, even if the wireless station 101 is not a non-mobile device and "Category 9" is set in the category of the UE capability, the base station 102 can judge that the volume of data transmitted from the wireless station 101 is small. In this case, by transmitting Activation to the wireless station 101, the base station 102 can transition to the mode of performing state transition by a preconfigured radio parameter, even if the wireless station 101 is not a non-mobile device.

Further, although the base station 102 performs communication by a mode of performing state transition by a preconfigured radio parameter, if a mode of configuring the radio parameter at each data communication and performing state transition is transitioned to, Deactivation is transmitted to the wireless station 101.

The transmission of Activation or Deactivation from the base station 102, for example, can be performed by the transmission of a physical downlink control channel (PDCCH) by the PHY control unit 511 or the MAC control unit 512. The reception of Activation or Deactivation by the wireless station 101, for example, can be performed by the reception of the PDCCH by the PHY control unit 411 or the MAC control unit 412.

Determination of whether to transmit activation by the base station 102, for example, can be performed based on the transition of the wireless station 101. For example, the base station 102 obtains from the wireless station 101, information that indicates the traveling speed of the wireless station 101 and; the traveling speed of wireless station 101 is less or equal to a threshold for a given period or longer, the base station determines that the wireless station 101 is not moving and determines that Activation is to be sent. Further, for example, by estimating Doppler frequency based on an uplink signal such as sounding reference signal (SRS) that is periodically transmitted by the wireless station 101, the traveling speed can be estimated.

Figure 8:
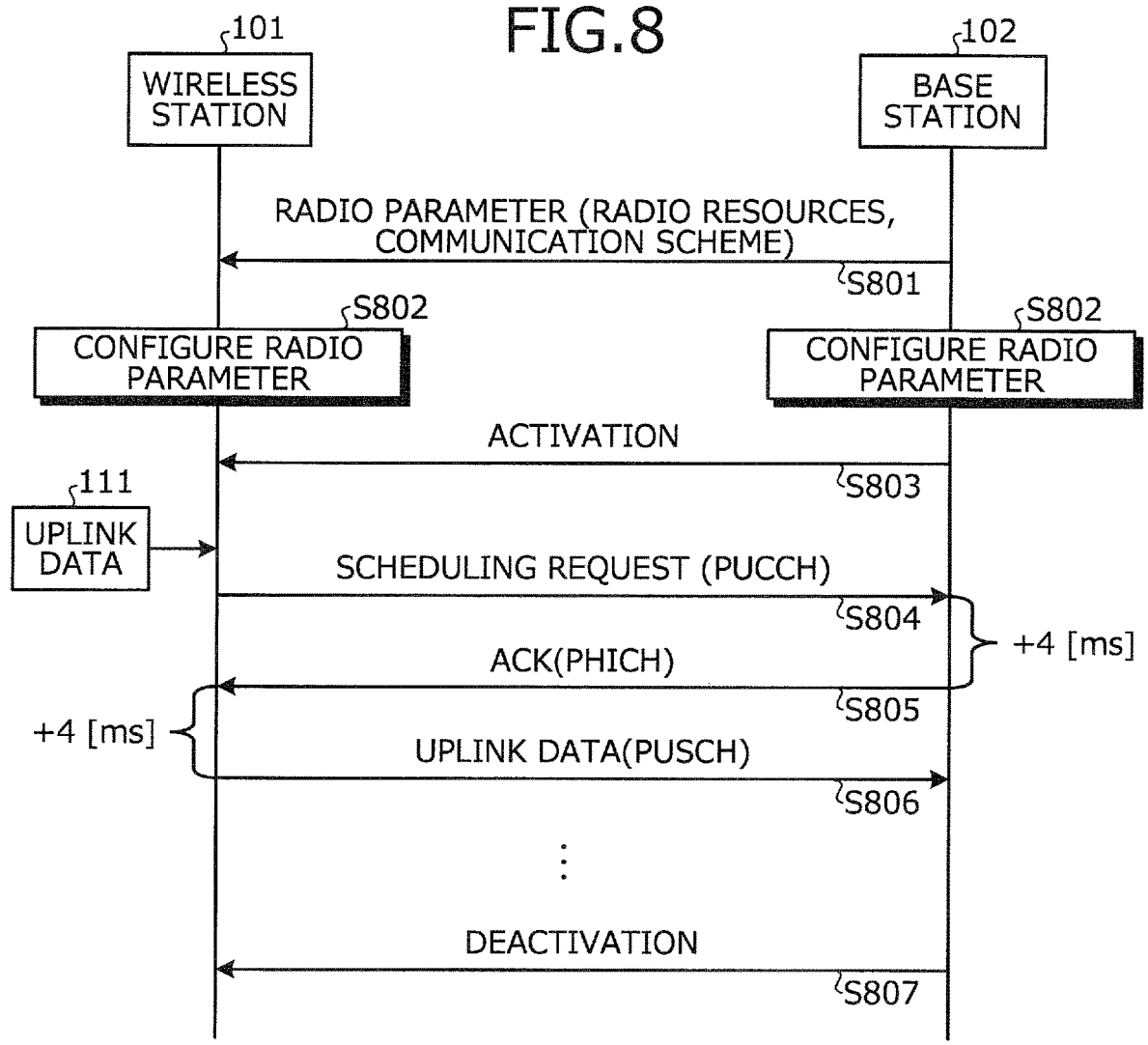
FIG. 8 is a sequence diagram depicting one example of operation of the wireless communications system according to a fourth embodiment.

FIG. 8 is a sequence diagram depicting one example of operation of the wireless communications system according to the fourth embodiment. The wireless station 101 and the base station 102 of the wireless communications system according to the fourth embodiment, for example, execute the following steps.

Steps S801 and S802 depicted in FIG. 8 are the same as steps S201 and S202 depicted in FIG. 2. Subsequent to step S802, the base station 102 transmits Activation to the wireless station 101 (step S803). Thus, the wireless station 101 and the base station 102 transition to a mode of transmitting uplink data by a preconfigured radio parameter.

Steps S804 to S806 depicted in FIG. 8 are the same as steps S203 to S205 depicted in FIG. 2. The base station 102, at an arbitrary timing, transmits Deactivation to the wireless station 101 (step S807). Thus, the mode of transmitting uplink data by the preconfigured radio parameter is released and, the wireless station 101 and the base station 102 transition to a mode of configuring the radio parameter, for each transmission of uplink data.

A PDCCH can be used at the control signal giving notification of Activation and Deactivation, for example. Alternatively, a MAC control element (CE) can be used as the control signal giving notification of Activation and Deactivation.

Figure 9:
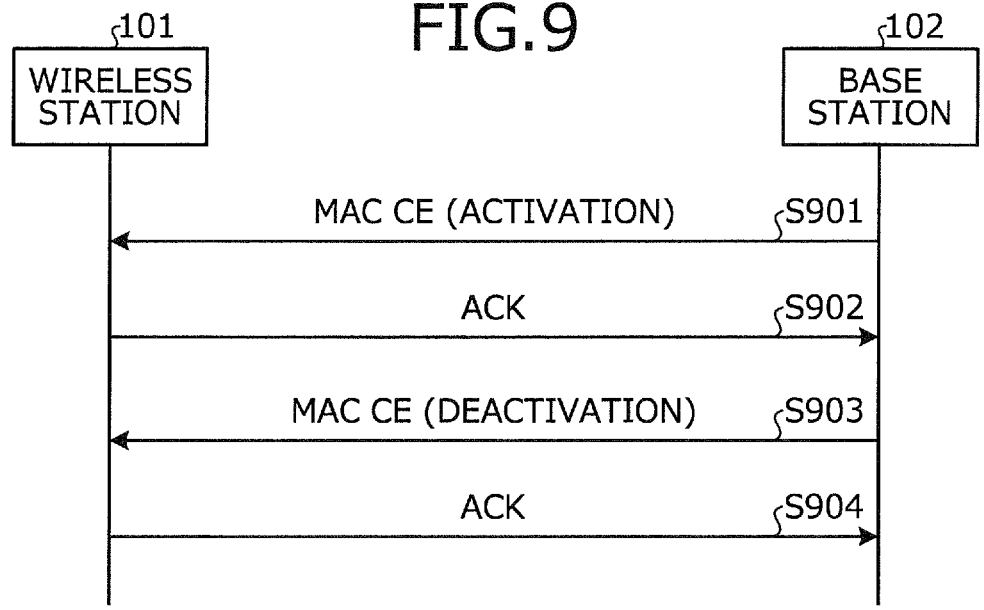
FIG. 9 is a sequence diagram depicting one example of operation of transmission/reception of a MAC CE.

FIG. 9 is a sequence diagram depicting one example of operation of transmission/reception of a MAC CE. When a MAC CE is used as the control signal giving notification of Activation and Deactivation, the wireless station 101 and the base station 102, for example, execute the following steps.

If the wireless station 101 is not a non-mobile device and "Category 9" is set in the category of the UE capability, the base station 102 transmits to the wireless station 101, a MAC CE giving notification of Activation (step S901). The wireless station 101 transmits to the base station 102, an ACK, which is a response signal for the MAC CE transmitted at step S901 (step S902). As a result, the wireless station 101 and the base station 102 transition to the mode of transmitting uplink data by a preconfigured radio parameter.

Further, if the mode of transmitting uplink data by a preconfigured radio parameter is to be terminated, the base station 102 transmits to the wireless station 101, a MAC CE giving notification of Deactivation (step S903). The wireless station 101 transmits to the base station 102, an ACK, which is a response signal for the MAC CE transmitted at step S903 (step S904). As a result, the wireless station 101 and the base station 102 transition to the mode of configuring the radio parameter at each transmission of uplink data.

Figure 10:
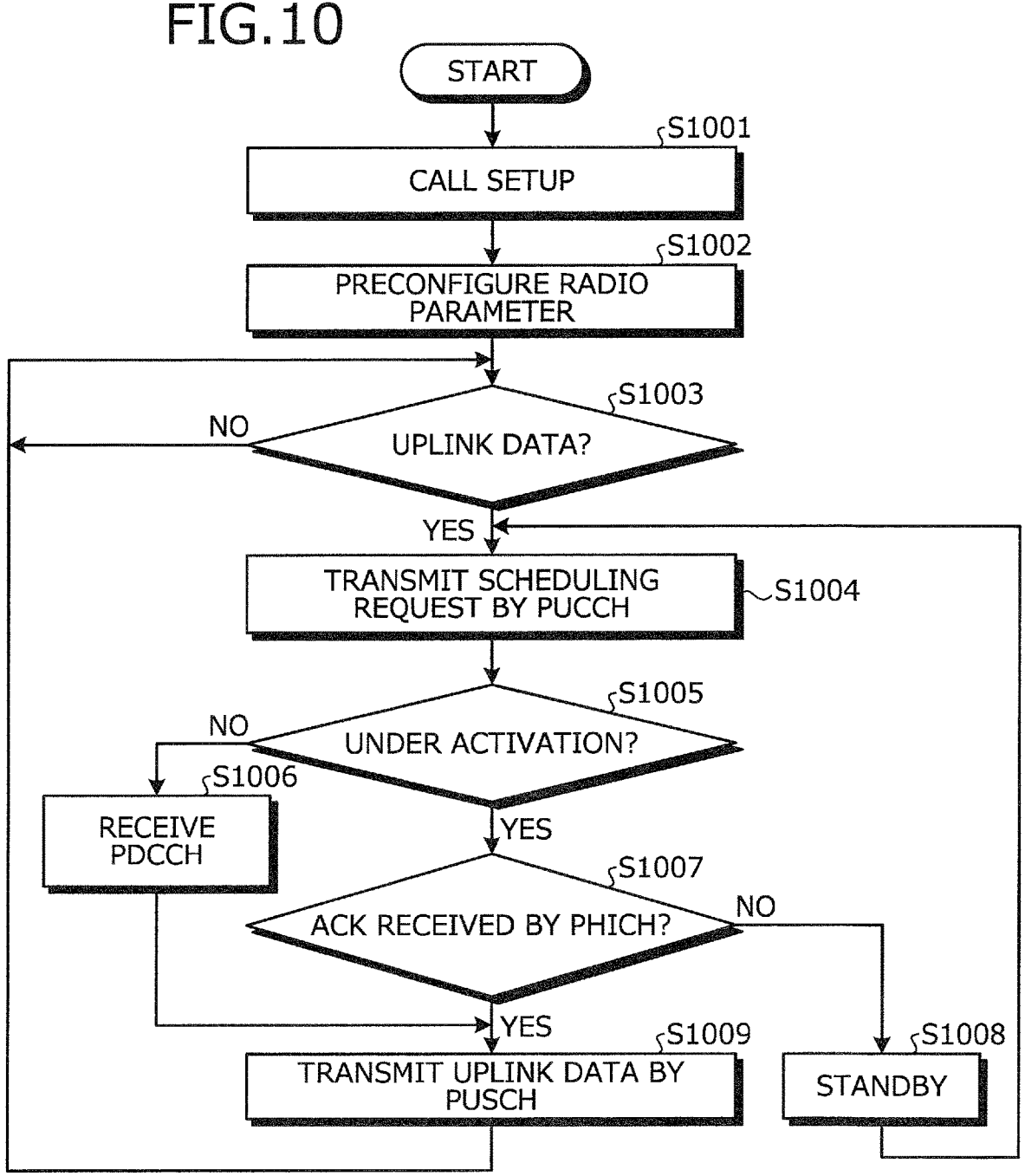
FIG. 10 is a flowchart depicting an example of operations of the wireless station according to the fourth embodiment.

FIG. 10 is a flowchart depicting an example of operations of the wireless station according to the fourth embodiment. If the wireless station 101 is a static device, the wireless station 101 according to the fourth embodiment, for example, execute the steps depicted in FIG. 6. If the wireless station 101 is not a static device, the wireless station 101 according to the fourth embodiment, for example, executes the following steps.

Steps S1001 to S1004 depicted in FIG. 10 are the same as steps S601 to S604 depicted in FIG. 6. Based on step S1004, the wireless station 101 determines whether Activation in progress (step S1005). For example, the wireless station 101 receives Activation from the base station 102 and thereafter, if Activation is not being received from the base station 102, the wireless station 101 determines that Activation is in progress. Further, if the wireless station 101 has not received Deactivation from the base station 102 or after receiving Deactivation from the base station 102, the wireless station 101 determines that Activation is not in progress.

At step S1005, if Activation is not progress (step S1005: NO), the wireless station 101 receives the PDCCH from the base station 102 (step S1006), and transitions to step S1009. If Activation is in progress (step S1005: YES), the wireless station 101 transitions to step S1007.

Steps 1007 to S1009 depicted in FIG. 10 are the same as steps S605 to S607 depicted in FIG. 6. However, in the case of transition from step S1006 to step S1009, in the transmission of uplink data at step S1009, the radio parameter specified by the base station 102, via the PDCCH received at step is used.

Figure 11:
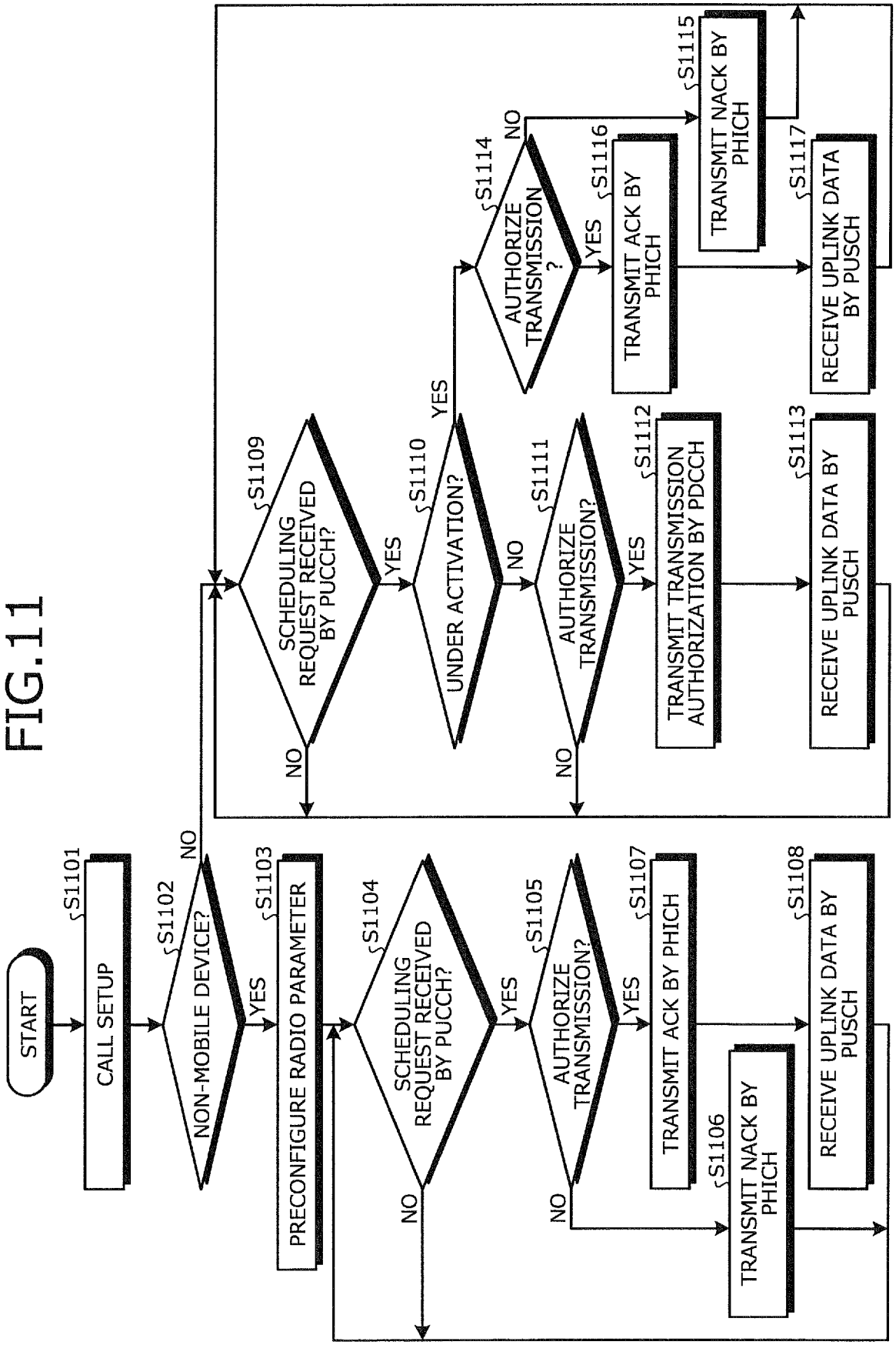
FIG. 11 is a flowchart depicting an example of operations of the base station according to the fourth embodiment.

FIG. 11 is a flowchart depicting an example of operations of the base station according to the fourth embodiment. The base station according to the fourth embodiment, for example, executes the following steps. Step S1101 to S1109 depicted in FIG. 11 are the same as steps S701 to S709 depicted in FIG. 7. At step S1109, upon receiving a scheduling request (step S1109: YES), the base station 102 determines whether Activation is in progress (step S1110).

For example, if the base station 102 transmits Activation to the wireless station 101 and thereafter, transmits Deactivation to the wireless station 101, the base station 102 determines that Activation is in process. Further, if Activation is has not been transmitted to the wireless station 101 or after transmission of Deactivation to the wireless station 101, the base station 102 determines that Activation is not in progress.

At step S1110, if Activation is not in progress (step S1110: NO), the base station 102 transitions to step S1111. Steps S1111 to S1113 depicted in FIG. 11 are the same steps S710 to S712 as depicted in FIG. 7.

At step S1110, if Activation is progress (step S1110: YES), the base station 102 performs the same operations as in the case of the wireless station 101 being a static device. In other words, the base station 102 determines whether to authorize the transmission of uplink data from the wireless station 101 (step S1114).

At step S1114, if the transmission is not to be authorized (step S1114: NO), the base station 102 transmits NACK to the wireless station 101, via the PHICH (step S1115), and returns to step S1109. If the transmission is to be authorized (step S1114: YES), the base station 102 transmits ACK to the wireless station 101, via PHICH (step S1116). Subsequently, the base station 102 receives uplink data from the wireless station 101, via the PUSCH, and returns to step S1109.

Thus, according to the wireless communications system according to the fourth embodiment, if the wireless station 101 is not a static device (specified type of wireless station), a method of configuring a radio parameter according to the state of the wireless station 101 can be switched to. For example, a state of transmitting uplink data by a radio parameter configured using a first control signal according to the state of the wireless station 101 and a state of transmitting uplink data irrespective of the radio parameter configured using the first control signal.

Thus, if the wireless station 101 is not a static device, a mode of transmitting uplink data using a radio parameter configured according to the state of the wireless station 101 and a mode of configuring the radio parameter for each transmission of uplink data can be switched between. For example, if the wireless station 101 is static, communication efficiency can be facilitated by switching to the mode of transmitting uplink data via the preconfigured radio parameter. Further, the wireless station 101 is moving, improvement of the communication quality can be facilitated by configuring the radio parameter for each transmission of uplink data.

Figure 12:
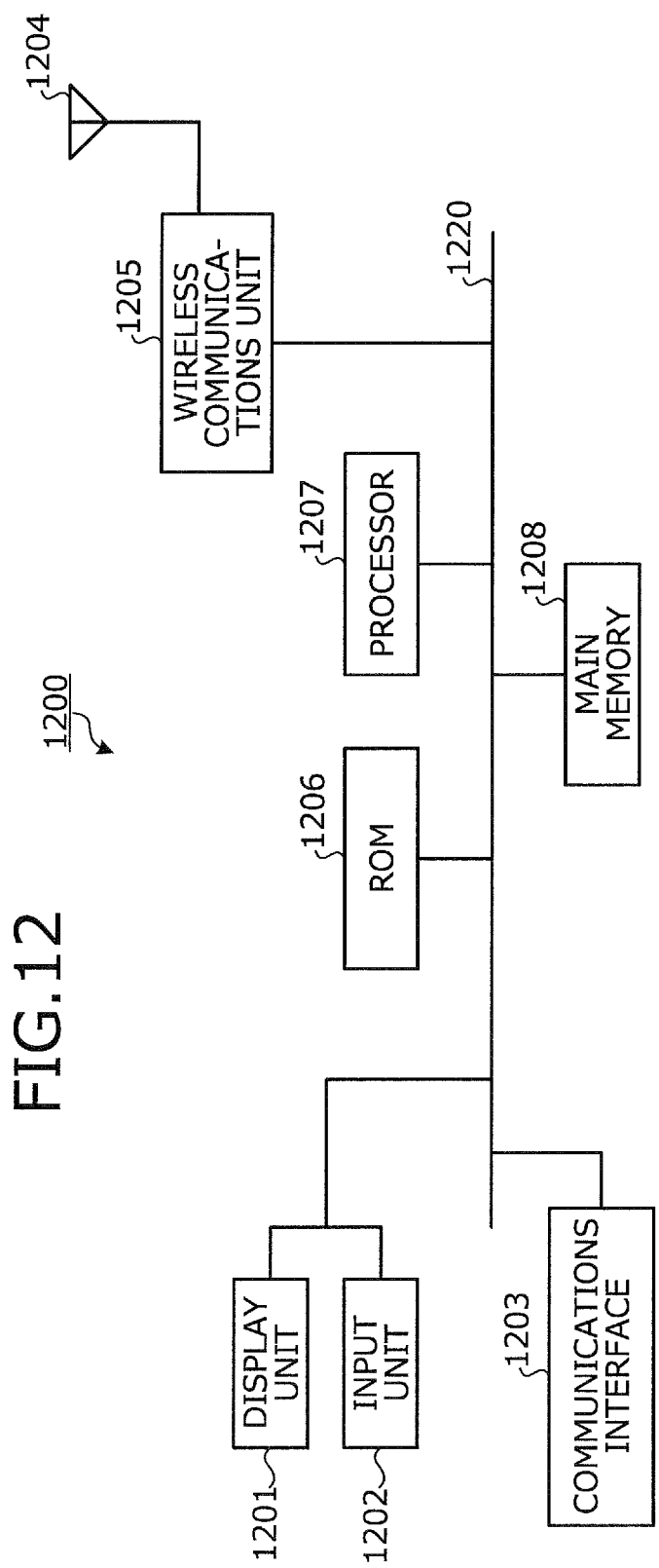
FIG. 12 is a diagram of one example a hardware configuration of the wireless station.

FIG. 12 is a diagram of one example a hardware configuration of the wireless station. The wireless station 101 of each of the embodiments described above, for example, can be realized by a communications apparatus 1200 depicted in FIG. 12. The communications apparatus 1200 includes a display unit 1201, an input unit 1102, a communications interface 1203, an antenna 1204, a wireless communications unit 1205, read-only memory (ROM) 1206, a processor 1207, a main memory 1208, and a bus 1220.

The display unit 1201, the input unit 1102, the communications interface 1203, the wireless communications unit 1205, the ROM 1206, and the main memory 1208 are connected, via the bus 1220, to the processor 1207.

The display unit 1201 is a user interface that displays information for the operator. The display unit 1201, for example, is a liquid crystal display. The input unit 1102 is a user interface that receives input of information from the operator. The input unit 1102, for example, is a keypad or the like. The operator of the communications apparatus 1200 operates the communications apparatus 1200 by using the display unit 1201 and the input unit 1102, such as to input a telephone number.

The communications interface 1203, for example, is a speaker and a microphone. The operator of the communications apparatus 1200 uses the communications interface 1203 for audio telephone calls.

The antenna 1204 is connected to the wireless communications unit 1205. The wireless communications unit 1205 performs wireless communication via the antenna 1204 and under the control of the processor 1207.

The ROM 1206, for example, stores programs for executing various types of processes. The processor 1207 reads out various types of programs stored on the ROM 1206, loads the read program onto the main memory 1208, and executes various types of processes. A central processing unit (CPU), a field programmable gate array (FPGA), and the like may be used as the processor 1207, for example.

The antenna 422 depicted in FIG. 4, for example, may be realized by the antenna 1204. The communications unit 421 depicted in FIG. 4, for example, may be realized by the processor 1207 and the wireless communications unit 1205. The control unit 410 depicted in FIG. 4, for example, may be realized by the ROM 1206, the processor 1207, and the main memory 1208.

FIG. 13 is a diagram depicting one example of a hardware configuration of the base station. The base station 102 according the embodiments described above, for example, may be realized by a communications apparatus 1300 depicted in FIG. 13. The communications apparatus 1300 includes a display unit 1301, an input unit 1302, a communications interface 1303, an antenna 1304, a wireless communications unit 1305, ROM 1306, a processor 1307, main memory 1308, storage 1309, and a bus 1320.

The display unit 1301, the input unit 1302, the communications interface 1303, the wireless communications unit 1305, the ROM 1306, the main memory 1308, and the storage 1309 are connected, via the bus 1320, to the processor 1307.

The display unit 1301 is a user interface that displays information for the operator. The display unit 1301, for example, is a monitor. The input unit 1302 is a user interface that receives the input of information from the operator. The input unit 1302, for example, is a keyboard. The operator of the communications apparatus 1300 operates the communications apparatus 1300 by using the display unit 1301 and the input unit 1302, such as for inputting information for a setup program.

The communications interface 1303, for example, is a communications interface for communicating with higher level stations. The communications interface 1303, for example, is a network interface, an analog/digital converter (ADC), etc.

The antenna 1304 is connected to the wireless communications unit 1305. The wireless communications unit 1305 performs wireless communication, via the antenna 1304 and under the control of the processor 1307.

The ROM 1306, for example, stores programs for executing various types of processes. The processor 1307 reads out various types of programs stored on the ROM 1306, loads the read program onto the main memory 1308, and executes various types processes. A CPU, FPGA, and the like may be used as the processor 1307, for example. The storage 1309, for example, is a storage apparatus such as a hard disk. For example, a function of a buffer is realized by the storage 1309 and the processor 1307.

The antenna 522 depicted in FIG. 5, for example, may be realized by the antenna 1305. The physical-line interface 523 depicted in FIG. 5, for example, may be realized by the communications interface 1303. The communications unit 521 depicted in FIG. 5, for example, may be realized by the processor 1307 and the wireless communications unit 1305. The control unit 510 depicted in FIG. 5, for example, may be realized by the ROM 1306, the processor 1307, and the main memory 1308.

As described, the wireless communications system, the wireless station, the base station, and the communications method enable communication efficiency to be facilitated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communications system comprising:
a base station; and
a wireless station, wherein
the base station is configured to reserve, in advance, a radio parameter that includes at least any one among a frequency resource and communication scheme used in transmission of uplink data, the radio parameter configured by a first control signal which is an RRC message transmitted to the wireless station,
the wireless station is configured to transmit a second control signal to the base station when uplink data arises, the second control signal requesting authorization to transmit the uplink data via the radio parameter configured by the first control signal,
the base station configured to transmit a third control signal in response to the second control signal, the third control signal indicating whether the wireless station is authorized to transmit the uplink data via the radio parameter configured by the first control signal,
the wireless station, upon receiving an authorization transmitted via the third control signal, performing transmission of the uplink data to the base station via the radio parameter configured by the first control signal,
the wireless station is configured to transmit a fourth control signal to the base station when second uplink data different from the uplink data arises, the fourth control signal requesting authorization to transmit the second uplink data via the radio parameter configured by the first control signal,
the base station configured to transmit a fifth control signal in response to the fourth control signal, the fifth control signal indicating whether the wireless station is authorized to transmit the second uplink data via the radio parameter configured by the first control signal, and
the wireless station, upon receiving an authorization transmitted via the fifth control signal, performing transmission of the second uplink data to the base station via the radio parameter configured by the first control signal.

2. The wireless communications system according to claim 1, wherein
the first control signal includes a plurality of candidates of the radio parameter, and
the wireless station uses the radio parameter selected from the plurality of candidates to perform the transmission of uplink data.

3. The wireless communications system according to claim 1, wherein
the third control signal is an affirmative signal or a denial signal, indicating whether the transmission of uplink data is authorized.

4. The wireless communications system according to claim 3, wherein
the base station transmits the third control signal by a physical HARQ indicator channel.

5. The wireless communications system according claim 1, wherein
the base station transmits the third control signal when a given period has elapsed since receipt of the second control signal.

6. The wireless communications system according to claim 1, wherein
the second control signal is a signal requesting authorization of the transmission of uplink data.

7. The wireless communications system according to claim 1, wherein
the second control signal is a Physical Uplink Control Channel (PUCCH).

8. A wireless station configured to perform wireless communication with a base station in which a radio parameter is preconfigured and includes at least any one among a frequency resource and a communication scheme respectively used for transmission of uplink data, the wireless station comprising:
communications circuitry configured to:
receive from the base station a first control signal which is an RRC message used to configure the radio parameter;
transmit to the base station, a second control signal when uplink data arises, the second control signal requesting authorization to transmit the uplink data via the radio parameter configured by the first control signal; and
receive a third control signal from the base station in response to the second control signal, the third control signal indicating whether the wireless station is authorized to transmit the uplink data via the radio parameter configured by the first control signal;
control circuitry configured to perform control such that uplink data is transmitted to the base station via the radio parameter configured by the first control signal upon receiving an authorization transmitted via the third control signal,
the wireless station is configured to transmit a fourth control signal to the base station when second uplink data different from the uplink data arises, the fourth control signal requesting authorization to transmit the second uplink data via the radio parameter configured by the first control signal,
the base station configured to transmit a fifth control signal in response to the fourth control signal, the fifth control signal indicating whether the wireless station is authorized to transmit the second uplink data via the radio parameter configured by the first control signal, and
the wireless station, upon receiving an authorization transmitted via the fifth control signal, performing transmission of the second uplink data to the base station via the radio parameter configured by the first control signal.

9. The wireless station according to claim 8, wherein the second control signal is a Physical Uplink Control Channel (PUCCH).

10. A base station configured to wirelessly communicate with a wireless station and in which a radio parameter is preconfigured and includes at least any one among a frequency resource and a communication scheme respectively used in transmission of uplink data, the base station comprising:
communications circuitry configured to:
transmit to the wireless station a first control signal which is an RRC message used to configure the radio parameter;
receive a second control signal from the wireless station when uplink data arises, the second control signal requesting authorization to transmit the uplink data via the radio parameter configured by the first control signal; and
transmit a third control signal to the wireless station in response to the second control signal, the third control signal indicating whether the wireless station is authorized to transmit the uplink data via the radio parameter configured by the first control signal;
control circuitry configured to perform control such that the uplink data is received from the wireless station using the radio parameter configured via the first control signal when the third control authorizes the wireless station to transmit the uplink data via the radio parameter configured by the first control signal, wherein
the communications circuitry is further configured to:
receive a fourth control signal from the wireless station when second uplink data different from the uplink data arises, the fourth control signal requesting authorization to transmit the second uplink data via the radio parameter configured by the first control signal,
transmit a fifth control signal in response to the fourth control signal, the fifth control signal indicating whether the wireless station is authorized to transmit the second uplink data via the radio parameter configured by the first control signal, and
receiving the second uplink data from the wireless station via the radio parameter configured by the first control signal subsequent to the wireless station receiving an authorization transmitted via the fifth control signal.

11. The base station according to claim 10, wherein the second control signal is a Physical Uplink Control Channel (PUCCH).

* * * * *